US007319549B2

(12) United States Patent
Thakur (10) Patent No.: US 7,319,549 B2
(45) Date of Patent: Jan. 15, 2008

(54) MULTIPLE WEIGHT ERROR DIFFUSION

(75) Inventor: Khageshwar Thakur, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 982 days.

(21) Appl. No.: 10/401,240

(22) Filed: Mar. 27, 2003

(65) Prior Publication Data

US 2004/0190071 A1  Sep. 30, 2004

(51) Int. Cl.
*G06K 15/00* (2006.01)

(52) U.S. Cl. .................. 358/3.03; 358/3.04; 358/3.05; 358/1.9; 358/3.13; 382/252

(58) Field of Classification Search .............. 358/3.03, 358/3.05, 3.13, 1.9, 3.04; 382/252
See application file for complete search history.

(56) References Cited

U.S. PATENT DOCUMENTS

| | | | |
|---|---|---|---|
| 5,031,050 A | 7/1991 | Chan | 358/298 |
| 5,051,844 A * | 9/1991 | Sullivan | 358/3.03 |
| 5,140,432 A * | 8/1992 | Chan | 358/3.03 |
| 5,243,445 A | 9/1993 | Koike | 358/462 |
| 5,261,012 A * | 11/1993 | Hardy et al. | 382/258 |
| 5,268,774 A | 12/1993 | Eschbach | 358/466 |
| 5,313,287 A | 5/1994 | Barton | 358/458 |
| 5,317,653 A * | 5/1994 | Eschbach et al. | 382/252 |
| 5,363,213 A | 11/1994 | Coward et al. | 358/455 |
| 5,387,987 A | 2/1995 | Ino | 358/456 |
| 5,497,180 A | 3/1996 | Kawakami et al. | 347/131 |
| 5,515,456 A | 5/1996 | Ballard | 382/252 |
| 5,521,989 A | 5/1996 | Fan | 382/270 |
| 5,583,661 A | 12/1996 | Kurita et al. | 358/456 |
| 5,592,592 A | 1/1997 | Shu | 395/109 |
| 5,621,542 A | 4/1997 | Ohta et al. | 358/455 |
| 5,663,772 A | 9/1997 | Uehara et al. | 348/671 |
| 5,708,728 A | 1/1998 | Nomura | 382/162 |
| 5,719,957 A | 2/1998 | Nagata et al. | 382/176 |
| 5,737,453 A * | 4/1998 | Ostromoukhov | 382/275 |
| 5,748,772 A | 5/1998 | Moro et al. | 382/167 |
| 5,825,509 A | 10/1998 | Nomura | 358/456 |
| 5,835,687 A * | 11/1998 | Brown et al. | 358/1.9 |
| 5,892,851 A | 4/1999 | Nguyen | 382/252 |
| 5,917,614 A | 6/1999 | Levien | 358/456 |
| 5,931,960 A | 8/1999 | Kletter et al. | 714/704 |
| 5,949,965 A | 9/1999 | Gondek | 395/109 |
| 6,014,227 A | 1/2000 | Norton | 358/1.9 |
| 6,099,105 A | 8/2000 | Kakutani | 347/15 |
| 6,144,775 A | 11/2000 | Williams et al. | 382/252 |
| 6,172,768 B1 | 1/2001 | Yamada et al. | 358/1.9 |
| 6,271,936 B1 | 8/2001 | Yu et al. | 358/1.9 |

(Continued)

*Primary Examiner*—Twyler Lamb
*Assistant Examiner*—Jacky X. Zheng
(74) *Attorney, Agent, or Firm*—Taylor & Aust, P.C.

(57) ABSTRACT

A method for halftoning includes the steps of defining a first set of weight sets, and defining a second set of weight sets. A first error associated with a first pixel location of a plurality of pixel locations is diffused to a first neighboring at least one pixel location using a first weight set selected from the first set of weight sets, and a second error associated with a second pixel location of said plurality of pixel locations is diffused to a second neighboring at least one pixel location using a second weight set selected from the second set of weight sets. The first diffusing step and the second diffusing step are alternately performed along each scanline in the image to reduce visual artifacts.

33 Claims, 6 Drawing Sheets

U.S. PATENT DOCUMENTS

| | | | |
|---|---|---|---|
| 6,292,268 | B1 | 9/2001 | Hirota et al. ................. 358/1.9 |
| 6,307,647 | B1 * | 10/2001 | Cheung et al. ............ 358/3.04 |
| 6,344,903 | B1 | 2/2002 | Derhak et al. ............... 358/1.9 |
| 6,351,319 | B1 * | 2/2002 | Schweid et al. ............. 358/1.9 |
| 6,356,361 | B1 | 3/2002 | Ishikawa et al. ............ 358/1.9 |
| 6,356,362 | B1 | 3/2002 | Ostromoukhov ............ 358/1.9 |
| 6,427,030 | B1 | 7/2002 | Williams et al. ............ 382/252 |
| 6,510,252 | B1 * | 1/2003 | Kishimoto .................. 382/252 |
| 6,519,367 | B2 | 2/2003 | Nagarajan et al. ........... 382/252 |
| 6,603,575 | B2 * | 8/2003 | Schweid et al. ............ 358/3.26 |
| 6,608,700 | B1 * | 8/2003 | Mantell ....................... 358/1.9 |
| 7,057,773 | B2 * | 6/2006 | Ilbery ......................... 358/3.05 |
| 2002/0021839 | A1 * | 2/2002 | Takahashi ................... 382/194 |
| 2002/0051210 | A1 | 5/2002 | Ostromoukhov ........... 358/3.05 |
| 2002/0122210 | A1 * | 9/2002 | Mitchell Ilbery .......... 358/3.04 |
| 2004/0181727 | A1 * | 9/2004 | Ballard ....................... 714/742 |

\* cited by examiner

MULTIPLE WEIGHT ERROR DIFFUSION

BACKGROUND OF THE INVENTION

1. Field of the Invention

The present invention relates to a method of halftoning an image, and, more particularly, to halftoning using multiple weight error diffusion.

2. Description of the Related Art

In recent years many printers have been developed for home and office use. These printers are often used to reproduce continuous tone images displayed on other devices, such as computer monitors. Such continuous tone images may include scanned images, photos downloaded from the internet or from a digital camera, as well as images created or modified by a user with various application software products that are available to businesses and consumers alike. In order to reproduce continuous tone images on a printer, a process of halftoning must be performed on the image data before the image may be printed. Various halftoning methods are available, including dithering, blue noise masking, and error diffusion. These methods may be used individually or in combination, and are used in digital printing to convert multi-level i.e., gray level, input values to bi-level output values to be printed.

With the error diffusion method of halftoning, each input value associated with a pixel location in an image is compared with a threshold. If the input value along with any accumulated error is greater than the threshold, the pixel is turned on, i.e., printed, and an error, which is the difference between the input value and the maximum-input value of 255, is spread over to certain neighbors of the pixel, contributing to the accumulated error of those pixel neighbors. If input is smaller than the threshold, the pixel is not turned on, and the input value plus any accumulated error is spread over to certain neighbors of the pixel as error, contributing to the accumulated error of those pixel neighbors.

Prior are methods have not adequately addressed problems associated with a pixel grid that is not symmetric. For example, hardware limitations or efficiency considerations may require that pixels be placed in groups inside a grid. The grouping may sometimes break the symmetry of the grid, for example, where the pixels are placed in groups of two in a hexagonal grid. Under such circumstances, the neighboring pixels for each pixel in the group of two are different. In these cases, having the same threshold and spread ratio for all elements in the group of pixels may result in an output image that appears grainy.

What is needed in the art is a method of error diffusion that accommodates a pixel grid that is not symmetric.

SUMMARY OF THE INVENTION

The present invention provides a method of error diffusion that accommodates a pixel grid that is not symmetric by using multiple weight error diffusion.

The invention, in one form thereof, is directed to, a method for halftoning an image formed of an array of scanlines of pixels. The method includes defining a first set of weight sets; defining a second set of weight sets; first diffusing a first error associated with a first pixel location of a plurality of pixel locations to a first neighboring at least one pixel location using a first weight set selected from the first set of weight sets; second diffusing a second error associated with a second pixel location of the plurality of pixel locations to a second neighboring at least one pixel location using a second weight set selected from the second set of weight sets; and alternatingly performing the first diffusing step and the second diffusing step along each scanline in the image to reduce visual artifacts.

In another form thereof, the invention is directed to, a system including a processing unit executing instructions for carrying out a computer executable method for halftoning an image, the image formed of an array of scanlines of pixels. The method includes accessing a first set of weight sets; accessing a second set of weight sets; first diffusing a first error associated with a first pixel location of a plurality of pixel locations to a first neighboring at least one pixel location using a first weight set selected from the first set of weight sets; second diffusing a second error associated with a second pixel location of the plurality of pixel locations to a second neighboring at least one pixel location using a second weight set selected from the second set of weight sets; and alternatingly performing the first diffusing step and the second diffusing step along each scanline in the image to reduce visual artifacts.

In yet another form thereof, the invention is directed to a method for halftoning an image. The method includes the steps of determining a plurality of distinct pixel neighborhoods used in forming the image; defining a plurality of sets of weight sets, the plurality of distinct pixel neighborhoods corresponding in number to the plurality of sets of weight sets; and diffusing error associated with a plurality of pixel locations to neighboring pixel locations using each of the plurality of sets of weight sets, wherein the plurality of sets of weight sets are selectively applied based on a particular distinct pixel neighborhood of the plurality of distinct pixel neighborhoods.

An advantage of the present invention is the ability to halftone an image with reduced visual artifacts.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 1:
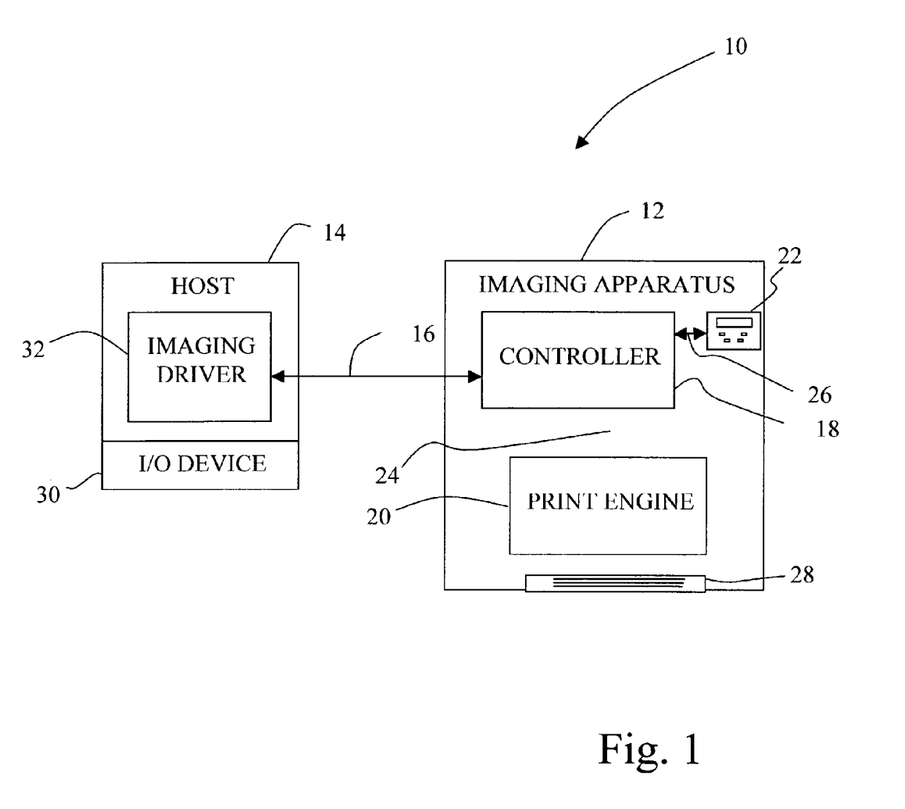
FIG. 1 is a diagrammatic depiction of a system that utilizes the present invention.

Referring now to the drawings, and particularly to FIG. 1, there is shown a diagrammatic depiction of a system 10 embodying the present invention. System 10 includes an imaging apparatus 12 and a host 14. Imaging apparatus 12 communicates with host 14 via a communications link 16.

Imaging apparatus 12 can be, for example, an ink jet printer and/or copier, or an electrophotographic printer and/or copier. Imaging apparatus 12 includes a controller 18, a print engine 20 and a user interface 22.

Controller 18 includes a processor unit and associated memory, and may be formed as an Application Specific Integrated Circuit (ASIC). Controller 18 communicates with print engine 20 via a communications link 24. Controller 18 communicates with user interface 22 via a communications link 26.

In the context of the examples for imaging apparatus 12 given above, print engine 20 can be, for example, an ink jet print engine or an electrophotographic print engine, configured for forming an image on a print medium 28, such as a sheet of paper, transparency or fabric.

Host 14 may be, for example, a personal computer including an input/output (I/O) device 30, such as keyboard and display monitor. Host 14 further includes a processor, input/output (I/O) interfaces, memory, such as RAM, ROM, NVRAM, and a mass data storage device, such as a hard drive, CD-ROM and/or DVD units. During operation, host 14 includes in its memory a software program including program instructions that function as an imaging driver 32, e.g., printer driver software, for imaging apparatus 12. Imaging driver 32 is in communication with controller 18 of imaging apparatus 12 via communications link 16. Imaging driver 32 facilitates communication between imaging apparatus 12 and host 14, and may provide formatted print data to imaging apparatus 12, and more particularly, to print engine 20. Alternatively, however, all or a portion of imaging driver 32 may be located in controller 18 of imaging apparatus 12.

Communications link 16 may be established by a direct cable connection, wireless connection or by a network connection such as for example an Ethernet local area network (LAN). Communications links 24 and 26 may be established, for example, by using standard electrical cabling or bus structures, or by wireless connection.

Figure 2:
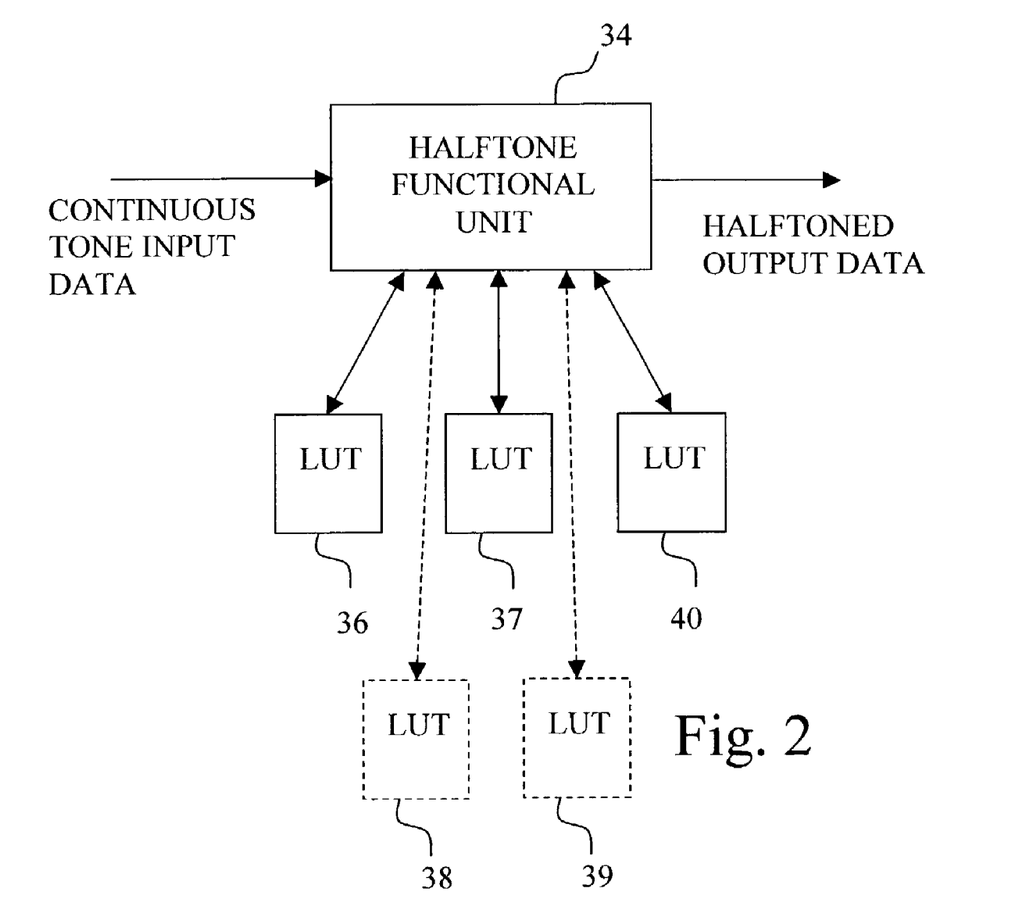
FIG. 2 is a diagrammatic depiction of a halftone functional unit according to the present invention.

Referring now to FIG. 2, there is shown a halftone functional unit 34, a first weight set lookup table (LUT) 36, a second weight set LUT 37, and a threshold LUT 40. Halftone functional unit 34 may be in the form of firmware or software, and may reside in a processing unit, such as either imaging driver 32 or controller 18. Alternatively, some portions of halftone functional unit 34 may reside in imaging driver 32, while other portions reside in controller 18. Halftone functional unit 34 accesses a first set of weight sets, such as from a plurality of weight sets stored in LUT 36, accesses a second set of weights sets, such as from a plurality of second weight sets stored in LUT 37, and accesses threshold values from threshold LUT 40 when performing halftoning, as described below. As used herein, the term, set of weight sets, refers to a compilation of weight sets, wherein a weight set, also known as a spread ratio, defines the proportion of error that will be spread, i.e., diffused, to neighboring pixels. Threshold LUT 40 is defined has storing threshold values that are determined in part based on a combination of at least a first weight set from the first set of weight sets stored in LUT 36 and a second weight set from the second set of weight sets stored in LUT 37. Although the depicted embodiment employs a first set of weight sets and a second set of weight sets, i.e., those stored LUT 36 and LUT 37, respectively, additional weight sets, such as a third set of weight sets, a fourth set of weight sets, etc., may be utilized, in keeping with the spirit of the present invention. For example a third set of weight sets might be stored in a third lookup table, such as LUT 38, depicted in FIG. 2 with dashed lines, and a fourth set of weight sets might be stored in a fourth lookup table, such as LUT 39, depicted in FIG. 2 with dashed lines.

A continuous tone image, i.e., an image having continuous tone data, such as, for example, data in a gray value range of 0-255, is received by halftone functional unit 34. Halftone functional unit 34 processes the continuous tone data using computer executable steps to convert the continuous tone data into binary data for printing by print engine 20. In performing halftoning, halftone functional unit 34 utilizes multiple weight error diffusion. Halftone functional unit 34 is automatically initiated when continuous tone image is supplied thereto.

In performing error diffusion, the intensity value, i.e., gray values of pixels of the original continuous tone image are used as input values, and are processed in order to determine output values for each corresponding output pixel in the output image. In the present embodiment, the input values have a dynamic range of, for example, 0 to 255. Output values provided by halftone functional unit 34 are binarized to output values of 0 or 1. A pixel having an output value of 0 will not be turned on, i.e., no pixel will be printed at the respective location on print medium 28, whereas a pixel having a binary output value of 1 will be printed by print engine at the respective location on print medium 28.

Figure 3:
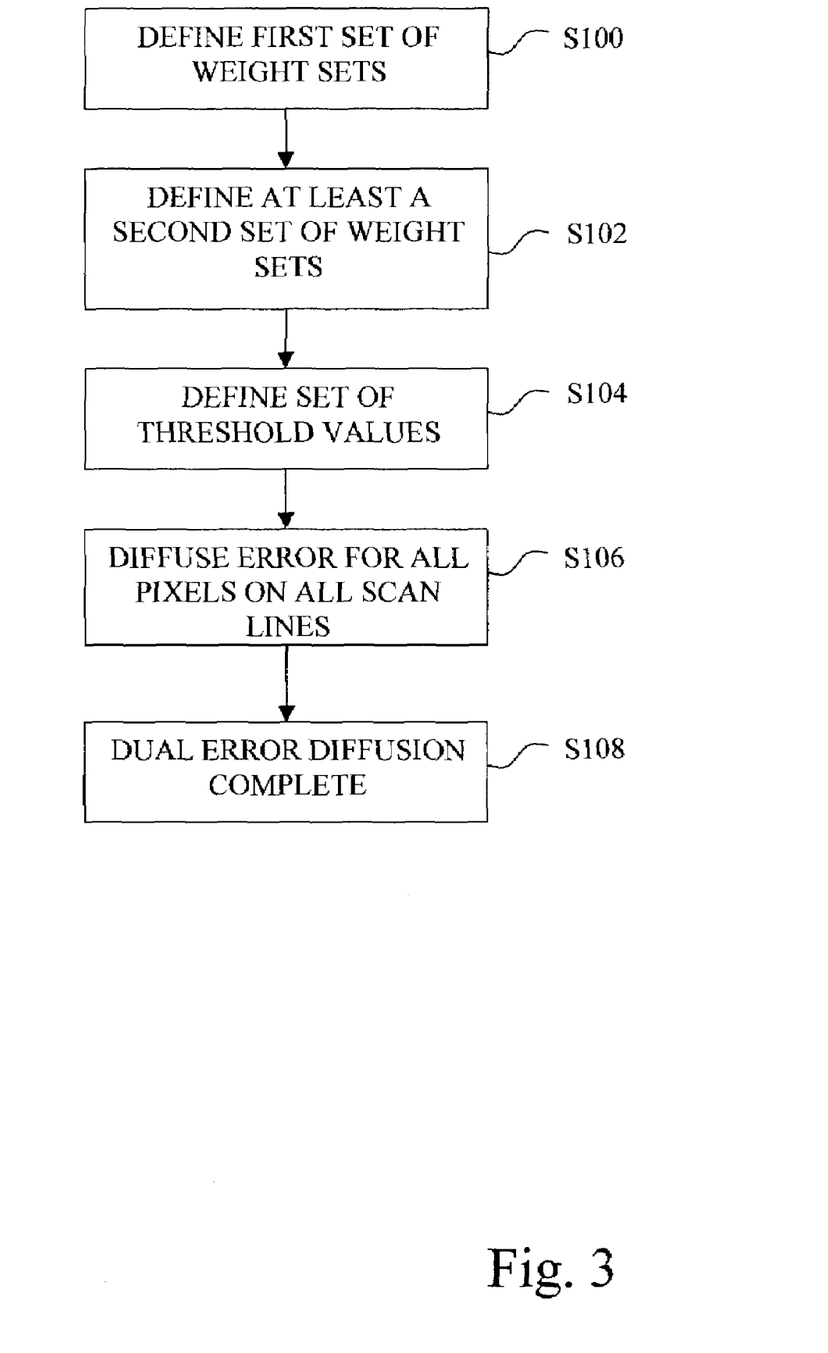
FIG. 3 is a flowchart of a general method of the present method.

Referring now to FIG. 3, there is shown a flowchart depicting, in summary form, the method steps S100 though S108 of an embodiment of the present invention. The method employs multiple weight error diffusion of an input image formed of an array of scanlines of pixels, each pixel having a gray value, for forming an output image. Briefly, the steps include S100, defining a first set of weight sets, S102, defining at least a second set of weight sets, and S104, defining a set of threshold values. Steps S100, S102, and S104 are preliminary steps that are used to store first weight sets in LUT 36, second weight sets in LUT, 37, and threshold values in LUT 40, respectively, for accessing by halftone functional unit 34 in performing the multiple weight error diffusion of step S106.

At step S106 the multiple weight error diffusion process is performed on an image, for example, by first diffusing a first error associated with a first pixel location of a plurality of pixel locations to a first neighboring at least one pixel location using a first weight set selected from the first set of weight sets; second diffusing a second error associated with a second pixel location of the plurality of pixel locations to a second neighboring at least one pixel location using a second weight set selected from the second set of weight sets; and alternatingly performing the first diffusing step and the second diffusing step for all pixels along each scanline in the image to reduce visual artifacts. For example, as pixels are sequentially encountered along a scanline, the process alternates between the first diffusing step and the second diffusing step. Of course, in embodiments where more than two sets of weights sets are used, then there is an alternating between two or more sets of weight sets along a scan line. For example, where more than two sets of weight sets used, such as three, four, or more sets of weight sets, the process would rotate, repeat, or alternate between the different sets of weight sets.

At step S108, the multiple error diffusion method of the present invention is considered completed.

The aforementioned steps are described in greater detail below. At steps S100 and S102, for weight sets to be stored in the first weight set LUT 36 and/or second weight set LUT 37 are determined empirically. Specific weights sets are selected from LUT 36 or LUT 37, based on gray level, i.e., input pixel values in the range of 0 to 255, and aspect ratio. The aspect ratio pertains to printer resolution settings, e.g., a setting of 1200 dots per inch (dpi) horizontal resolution by 600 dpi vertical resolution yields an aspect ratio of 1200:600, i.e., 2:1. Thus, each of first weight set LUT 36 and second weight set LUT 37 will include weight sets for each input pixel value in the range of 0 to 255 for each aspect ratio that is printable by print engine 20. The weight sets are determined empirically by inputting weight sets for each input pixel gray level value, for each aspect ratio, and by observing the results of the multiple weight error diffusion process. The weight sets that provide an image most visually free of artifacts are then selected for use in first weight set LUT 36 and second weight set LUT 37. The weight sets are arranged in each of first weight set LUT 36 and second weight set LUT 37 on the basis of input pixel value. In other words, each of first weight set LUT 36 and second weight set LUT 37, have a first weight set or second weight set, respectively, corresponding to each possible input value from 0 to 255, in increments of 1, for each aspect ratio. Each of first weight set LUT 36 and second weight set LUT 37 are accessed by halftone functional unit 34 in performing the error diffusion process of the present invention. The weight sets are in the form of $(r_{a1}:r_{a2})$ and $(r_{b1}:r_{b2})$, where $(r_{a1}:r_{a2})$ represents a weight set from first weight set LUT 36, and $(r_{b1}:r_{b2})$ represents a weight set from second weight set LUT 37. Here, $r_{a1}$ corresponds to the amount of error that will be spread from a first pixel location to one pixel neighbor of the first pixel, and $r_{a2}$ corresponds to the amount of error that will be spread from the first pixel location to another pixel neighbor. The values, $(r_{b1}:r_{b2})$, similarly correspond to how error will be spread to pixels neighboring a second pixel location. This concept may be expanded wherein a weight set may include more than two weights, for example, if each of the first and second weight sets includes three weights, then error may be diffused to three pixel neighbors of a first pixel location and a second pixel location. In such a case, the weight sets would be in the form of $(r_{a1}:r_{a2}:r_{a3})$ and $(r_{b1}:r_{b2}:r_{b3})$. The weights in each weight set correspond to the error to be diffused to neighboring pixels, preferably the closest neighboring pixels, for example, those adjacent the pixel from which error is sought to be diffused.

At step S104, threshold LUT 40 is created by determining threshold values for each possible input value in the range of 0 to 255, in increments of 1, for each aspect ratio, and placing each threshold value in threshold LUT 40 with a corresponding input value.

The threshold for each gray level is found such that each scanline gets an appropriate number of pixels turned on in the output image. This is accomplished by considering input gray level, maximum-input gray level and all weight set values. Determination of the threshold values is at least a two-part process. First, each threshold value in threshold LUT 40 is approximated by a calculation based on the weight set values associated with the corresponding input value and aspect ratio, and next, each threshold value is modified empirically.

For example, in calculating the threshold value for each input value, so as to accommodate two weight sets, $(r_{a1}:r_{a2})$ and $(r_{b1}:r_{b2})$, threshold T is given by:

$$T \le i \times \frac{1 - r^{1/i}}{1 - r} \qquad \text{(Equation 1)}$$

where i=input value, I=max (input), and r is given by the formula:

$$r = \sqrt{(r_{a1} \times r_{b1})/((r_{a1} + r_{a2}) \times (r_{b1} + r_{b2}))}. \qquad \text{(Equation 2)}$$

Each threshold value is then modified empirically by observing the results of the multiple weight error diffusion process.

Figure 4A:
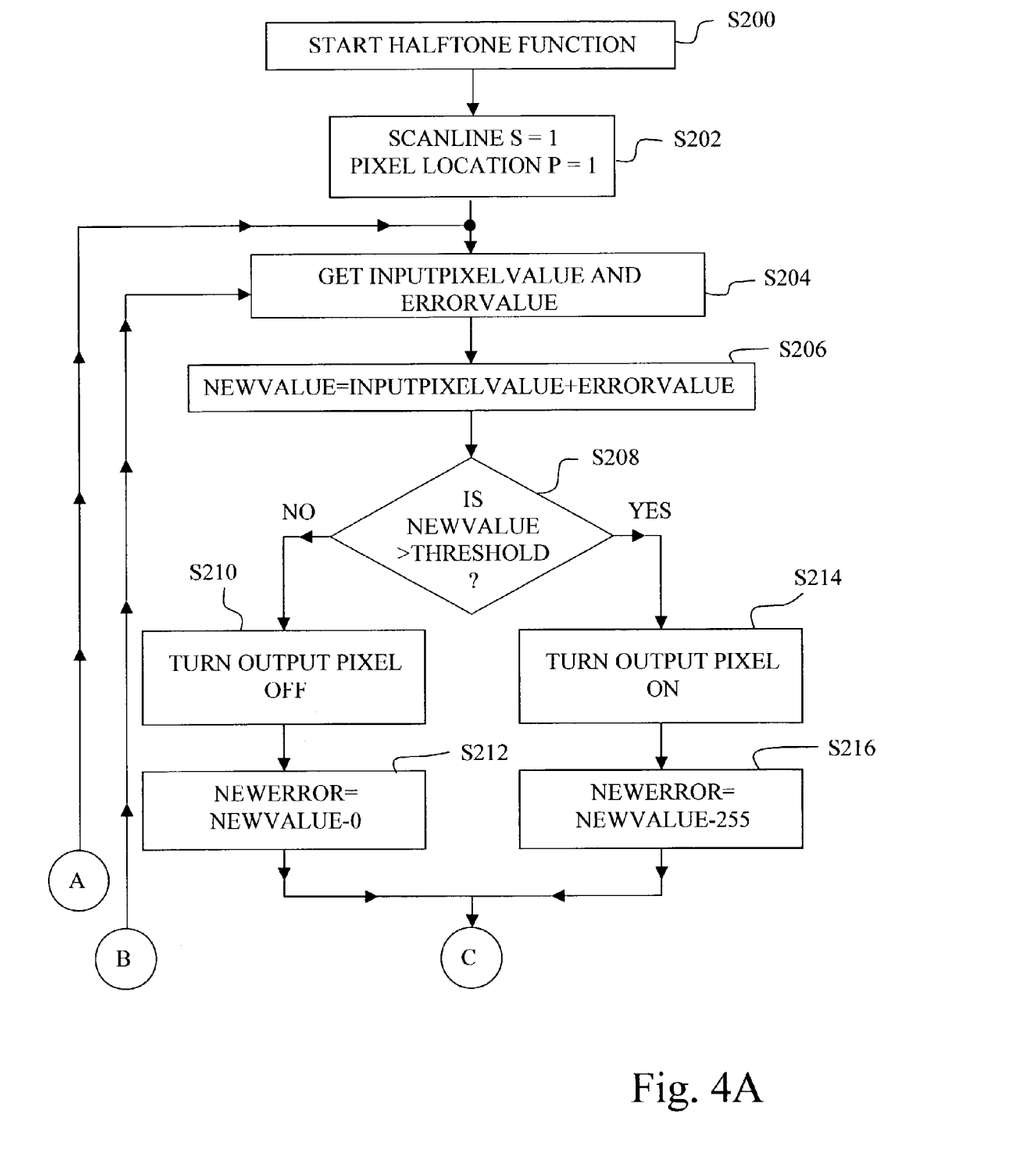
FIGS. 4A and 4B together form a flowchart depicting in more detail the error diffusion steps of the flowchart of FIG. 3.
Figure 4B:
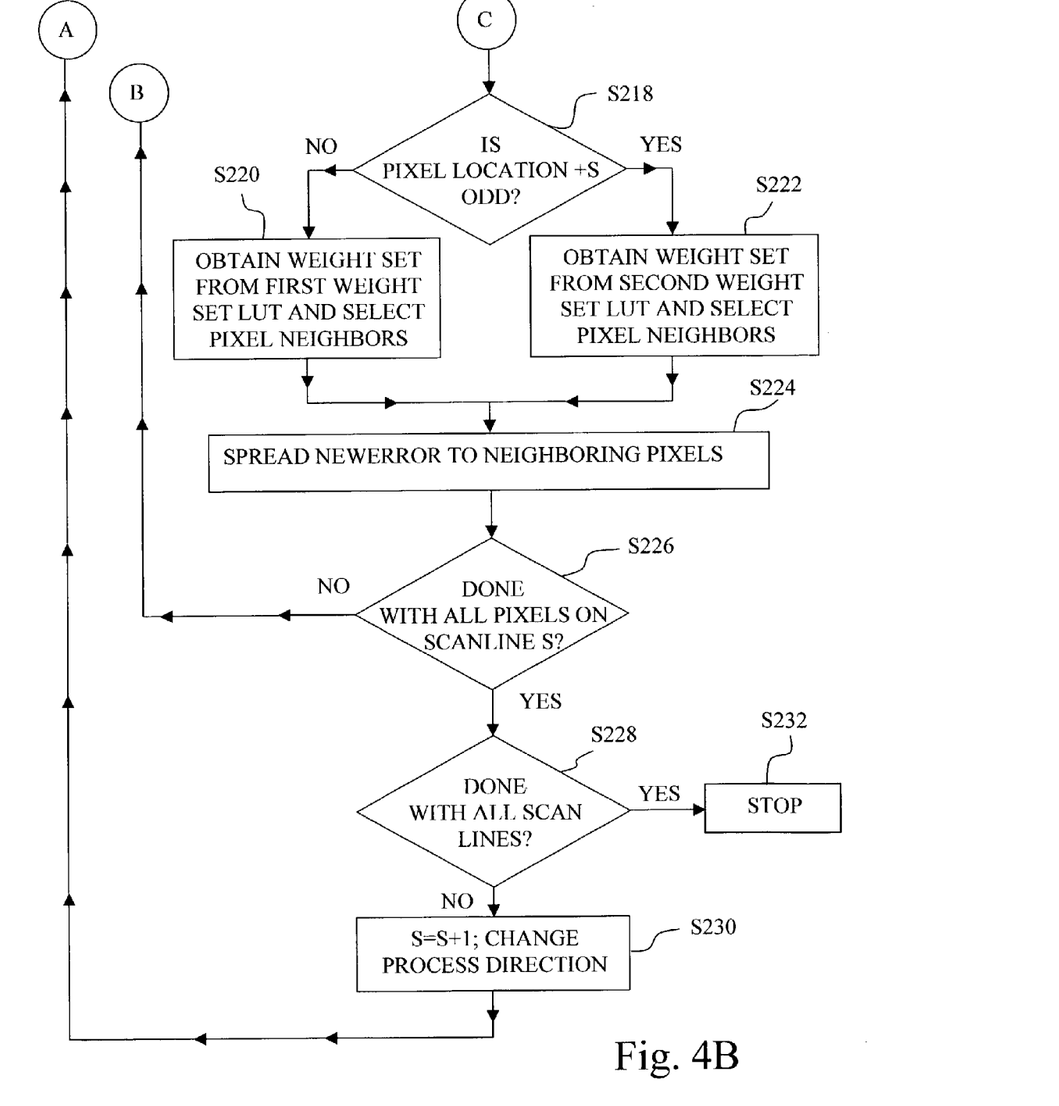

Referring now to FIGS. 4A and 4B, step S106 of FIG. 3 is described in greater detail through the use of an example representing an embodiment of the present invention. The embodiment illustrated in FIGS. 4A and 4B is only one way of practicing the present invention, and should not be construed as limiting the present invention to the depiction of FIGS. 4A and 4B. In describing FIGS. 4A and 4B, it is assumed that printed pixels are grouped such that a first pixel location has a different kind of neighborhood than a second pixel location.

Figure 5:
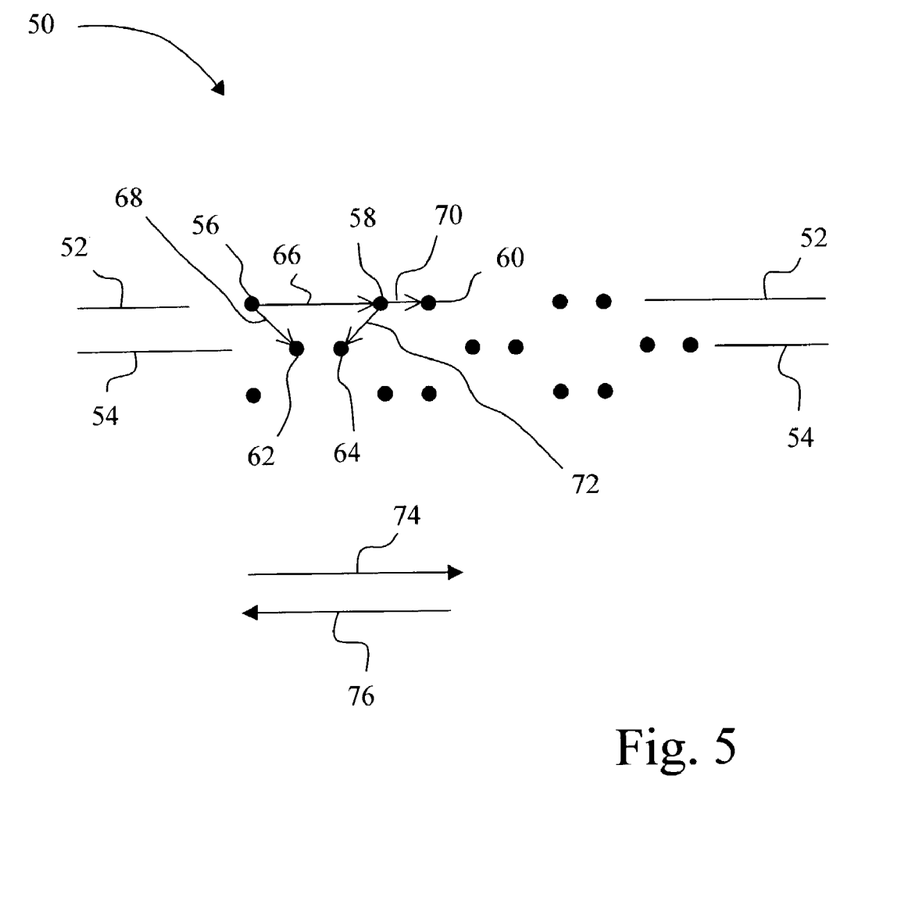
FIG. 5 shows a pixel arrangement in which the pixels are arranged in a hexagonal grid.

Referring now to FIG. 5, a portion of an image 50 is illustrated for convenience in understanding the method depicted in FIGS. 4A and 4B. Image 50 includes a plurality of scanlines, including a scanline 52 and a subsequent scanline 54. Image 50 also includes a plurality of pixel locations, including a pixel location 56, a pixel location 58, a pixel location 60, a pixel location 62, and a pixel location 64. Pixel location 56 is separated from neighboring pixel location 58 on scanline 52 by a distance indicated by arrow 66 and from neighboring pixel location 62 on subsequent scanline 54 by a distance indicated by arrow 68. Pixel location 58 is separated from neighboring pixel location 60 on scanline 52 by a distance indicated by arrow 70 and from neighboring pixel location 64 on subsequent scanline 54 by a distance indicated by arrow 72. Processing of image 50 takes place along scanlines in a scanning direction that includes in a first scan direction 74 and a second scan direction 76 that is opposite in direction relative to first scan direction 74.

As is apparent by reference to FIG. 5, the pixels are arranged in groups of 2 in a hexagonal grid pattern. It is clear that an arbitrary first pixel location, such as pixel location 56, has a distinct neighborhood relative to an adjacent second pixel location on the same scanline, such as pixel location 58, as indicated by the length and directions of arrow 66 and arrow 68 in comparison to arrow 70 and arrow 72. As used herein, the term, pixel neighborhood, refers to the collection of neighboring pixels relative to a current pixel, i.e., those pixels that are located in the near vicinity of the pixel from which error is sought to be spread. Typically, image 50 can include more than one distinct pixel neighborhood, such as illustrated in FIG. 5, where two distinct pixel neighborhoods are depicted. Although the exemplification in FIG. 5 shows 2 distinct pixel neighborhoods. i.e., the neighborhood seen by pixel location 56 and the neighborhood seen by pixel location 58, one skilled in the art would recognize that more than two distinct pixel neighborhoods may be possible. For example, an image might include three distinct pixel neighborhoods, or four or more distinct pixel neighborhoods.

A different set of weight sets is used by the present invention in spreading error from each arbitrary first pixel location, such as pixel location 58, than the set of weight sets used by the present invention in spreading error from each adjacent second pixel location, such as pixel location 60. For example, a weight set from the first set of weight sets stored in LUT 36 is used to diffuse error from pixel location 56 to its distinct neighborhood, and a weight set from a second set of weight sets stored in LUT 37 is used to diffuse error from pixel location 58 to its distinct neighborhood. The number of sets of weight sets used by the present invention is dependent upon the number of distinct pixel neighborhoods in the printed image. For example, with respect to FIG. 5, since two distinct pixel neighborhoods are depicted, a first set of weight sets and a second set of weight sets are used. The first set of weight sets is used in diffusing error to one of the distinct pixel neighborhoods, while the second set of weight sets is used to diffuse error to the other distinct pixel neighborhood, each set of weight sets being selectively applied based on a particular distinct pixel neighborhood of a plurality of distinct pixel neighborhoods. However, were there three or four, or more distinct pixel neighborhoods, additional sets of weight sets would be used. For example, there were three distinct pixel neighborhoods, three different sets of weight sets would be utilized, each sets of weight sets corresponding to one of the three distinct pixel neighborhoods, and being selectively supplied when diffusing error to each of the three distinct neighborhoods. If there were four distinct pixel neighborhoods, four different sets of weight sets would thus accordingly be utilized. Similarly, if there were more than four distinct pixel neighborhoods, the number of sets of weight sets would be selected according to the number of distinct pixel neighborhoods, and each of the sets of weight sets would be used to spread error to a corresponding distinct pixel neighborhood.

Generally, in processing image 50, wherein a first pixel input value is associated with the first pixel location, and a second pixel input value is associated with the second pixel location, halftone functional unit 34 performs the steps of adding a first accumulated error to the pixel input value, and the step of thresholding the first pixel input value using a first threshold to determine a first pixel output value. The first accumulated error is at least partially a result of a previous application of the first diffusing step with respect to a previous first pixel location of the plurality of pixel locations in image 50. With respect to the second pixel location, halftone functional unit 34 performs the steps of adding a second accumulated error to the second pixel input value, and thresholding the second pixel input value using a second threshold to determine a second pixel output value. The second accumulated error is at least partially a result of a previous application of the second diffusing step with respect to a previous second pixel location of the plurality of pixel locations. Each of the first threshold and the second threshold are selected from threshold lookup table Referring again to FIGS. 4A and 4B, a detailed description of the method step S106 of the present invention is provided, at times using pseudo code to represent certain variables.

At step S200, the halftone functional unit 34 is automatically started in response to a user command to print a continuous tone image. The continuous tone image is formed by an array of scanlines, such as scanlines 52, 54, each scanline having a plurality of pixels as shown in FIG. 5.

In step S202, scanline S is set to 1, and pixel location P is set to 1, corresponding to the first pixel location, e.g., pixel 56 on the first scanline, e.g., scanline 52.

At step S204, halftone functional unit 34 gets the numerical values for the variables INPUTPIXELVALUE and ERRORVALUE. INPUTPIXELVALUE is the original value of the current pixel in the input continuous tone image, here, the first (1) input pixel location 56 in the first (1) scanline 52. ERRORVALUE is the value of accumulated error spread, i.e., diffused, to the current pixel. Here, because the multiple weight error diffusion method has just started on the first pixel in the image, there is no accumulated error, thus ERRORVALUE is zero. Error is determined and spread in later steps S220, S222, and S224, contributing to the accumulated error of subsequent pixels.

At step S206, the variable NEWVALUE is numerically obtained by adding INPUTPIXELVALUE and ERRORVALUE. NEWVALUE is the value of the current pixel, including accumulated error, that is used in thresholding.

At step S208, thresholding is performed. Here, halftone functional unit 34 obtains a threshold value from threshold LUT 40 corresponding to INPUTPIXELVALUE for the current printer aspect ratio. NEWVALUE is then compared to the threshold value to determine whether to turn the current output pixel on or off. The output pixel is a pixel in the image to be printed, i.e., output image, that corresponds to the respective input pixel.

If, at step S208, NEWVALUE is less than or equal to the threshold value, the method branches to step S210, where halftone functional unit 34 sets the output pixel value to binary 0, thus turning the output pixel off. Then, in step S212, the variable NEWERROR is determined as NEWVALUE-0, and the method progresses to step S218.

If, at step S208, NEWVALUE is greater than the threshold value, the method branches to step S214, where halftone functional unit 34 sets the output pixel value to binary 1, thus turning the output pixel on. Then, at step S214, the variable NEWERROR is determined as NEWVALUE-255, and the method progresses to step S218.

At step S218, a determination is made as to whether scanline S plus pixel location P is an odd number. If the result is not an odd number, the method proceeds to step S220. If the result is an odd number, the method proceeds to step S222. The determination made at step S218 is in order to ensure that, because the pixels are grouped such that a first pixel location has a different kind of neighborhood than a second pixel location adjacent the first pixel location in the scan direction, each such pixel has error diffused with the appropriate weight set, i.e., weight sets ($r_{a1}$:$r_{b2}$) and ($r_{b1}$:$r_{b2}$) selected from first weight set LUT 36 and second weight set LUT 37, respectively. The error is diffused to the appropriate neighbors that are selected in steps S220 and S222.

Since halftone functional unit 34 selects each pixel location in sequence, the determination made in step S218 will alternate with each pixel in a given scanline. Also, in one embodiment of the invention, the processing of the scanlines is performed in a serpentine fashion (by virtue of changing the scan direction after each scanline in step S230, below), and assuming each scanline has the same number of pixels, the determination made in step S218 will direct the process to the appropriate of step S220 and S222, maintaining the use of the appropriate alternating weight sets for each pixel location and its corresponding distinct pixel neighborhood.

At step S220, halftone functional unit 34 obtains a weight set from first weight set LUT 36, based on INPUTPIXELVALUE.

Referring again to FIG. 5, pixel neighbors selected in step S220 are the first adjacent pixel on the current scanline in the scan direction, such as pixel location 58 in scanline 52 in first scan direction 74, and the first adjacent pixel in first scan direction 74 in the subsequent scanline, such as pixel location 62 on subsequent scanline 54.

At step S222, halftone functional unit 34 obtains a weight set from second weight set LUT 37, based on INPUTPIXELVALUE, and selects pixel neighbors to which error will be spread from the current pixel. Here, for example, with reference to pixel location 58, pixel neighbors selected in step S222 are the first adjacent pixel on the current scanline in the scan direction, such as pixel location 60 in scanline 52 in first scan direction 74, and the first adjacent pixel opposite the scan direction in the subsequent scanline, such as pixel location 64 on subsequent scanline 54 in second scan direction 76.

At step S224, error is diffused (spread) to neighboring pixels in accordance with the weight set and pixel neighbors selected in step S220 or step S222. For the first pixel in an image, and then each second subsequent pixel, step 220 is selected by the determination of step S218, thus first diffusing a first error associated with a first pixel location of a plurality of pixel locations to a first neighboring at least one pixel location using a first weight set selected from first weight set LUT 36, the first set of weight sets. As indicated in step FIG. 5, the first neighboring at least one pixel location includes first neighboring two pixel locations located on one of current scanline 52 and a subsequent scanline 54, and located adjacent the first pixel location in a direction the same as the scan direction or in a direction opposite to the scan direction. For example, see pixel location 58 in scanline 52, and pixel location 62 on subsequent scanline 54, relative to first pixel location 56. However, the present invention also accommodates wherein the first neighboring at least one pixel location includes, for example, first neighboring three pixel locations, such as pixel location 58, pixel location 62, and pixel location 64.

For the second pixel selected, and each second subsequent pixel, step S222 is selected by the determination of step S218, thus second diffusing a second error associated with a second pixel location of the plurality of pixel locations to a second neighboring at least one pixel location using a second weight set selected from the second weight set LUT 37. As indicated in FIG. 5, the second neighboring at least one pixel location includes second neighboring two pixel locations located on one of a current scanline and a subsequent scanline, and located adjacent the second pixel location in a direction the same as scan direction or in a direction opposite to the scan direction. For example, see pixel location 60 in scanline 52, and pixel location 64 on subsequent scanline 54, relative to second pixel location 58. However, the present invention also accommodates wherein the second neighboring at least one pixel location includes, for example, second neighboring three pixel locations, such as pixel location 60, pixel location 64, and pixel location 62.

At step S226, a determination is made as to whether all pixels on a scanline were processed. If not, halftone functional unit 34 returns processing to step S204 to select the next pixel, in the scan direction, in the current scanline, and to continue processing. If all pixels were processed, the process moves to step S228, where a determination is made as to whether all scanlines in the image, such as image 50, have been processed. If so, the process is stopped at step S232.

If at step S228 if it is determined that all scanlines were not processed, the process flow moves to step S230, where scanline S is incremented by one in order to process the next scanline, and the scan direction is changed. As a result of step S228, the scan direction changes for each subsequent scanline in the image to one of the first scan direction 74 and the second scan direction 76, whereby the image is processed in a serpentine fashion. For example, here, after completing the first scanline 52, the scan direction changes from first scan direction 74 to second scan direction 76 for processing along subsequent scanline 54.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method for halftoning an image formed of an array of scanlines of pixels, comprising the steps of:
    defining a first set of weight sets;
    defining a second set of weight sets;
    first diffusing a first error associated with a first pixel location of a plurality of pixel locations to a first neighboring at least one pixel location using a first weight set selected from said first set of weight sets;
    second diffusing a second error associated with a second pixel location of said plurality of pixel locations to a second neighboring at least one pixel location using a second weight set selected from said second set of weight sets; and
    alternatingly performing said first diffusing step and said second diffusing step along each scanline in said image to reduce visual artifacts.

2. The method of claim 1, wherein a first pixel input value is associated with said first pixel location, and a second pixel input value is associated with said second pixel location, further comprising:
    adding a first accumulated error to said first pixel input value;
    thresholding said first pixel input value using a first threshold to determine a first pixel output value;
    adding a second accumulated error to said second pixel input value; and
    thresholding said second pixel input value using a second threshold to determine a second pixel output value,
    wherein each of said first threshold and said second threshold are selected from a threshold lookup table having threshold values that are determined in part based on a combination of at least a first weight set from said first set of weight sets and a second weight set from said second set of weight sets, and
    wherein said first accumulated error is at least partially a result of a previous application of said first diffusing step with respect to a previous first pixel location of said plurality of pixel locations, and said second accumulated error is at least partially a result of a previous application of said second diffusing step with respect to a previous second pixel location of said plurality of pixel locations.

3. The method of claim 1, wherein in said first diffusing step, said first neighboring at least one pixel location includes first neighboring two pixel locations.

4. The method of claim 3, wherein each of said first neighboring two pixel locations are located on one of a current scanline and a subsequent scanline.

5. The method of claim 4, wherein each of said first neighboring two pixel locations are located adjacent said first pixel location in a direction the same as said scan direction or in a direction opposite to said scan direction.

6. The method of claim 1, wherein in said second diffusing step, said second neighboring at least one pixel location includes second neighboring two pixel locations.

7. The method of claim 6, wherein each of said second neighboring two pixel locations are located on one of a current scanline and a subsequent scanline.

8. The method of claim 7, wherein each of said second neighboring two pixel locations are located adjacent said second pixel location in a direction the same as said scan direction or in a direction opposite to said scan direction.

9. The method of claim 1, having a first scan direction and a second scan direction, said second scan direction being opposite said first scan direction, further comprising changing a scanning direction from said first scan direction to said second scan direction or changing said scanning direction from said second scan direction to said first scan direction.

10. The method of claim 9, wherein said scanning direction changes for each subsequent scanline in said image to one of said first scan direction and said second scan direction, whereby said image is scanned in a serpentine fashion.

11. The method of claim 1, wherein said first set of weight sets is stored in a first weight set lookup table, and said second set of weight sets is stored in a second weight set lookup table.

12. The method of claim 1, wherein in said first diffusing step, said first neighboring at least one pixel location includes first neighboring more than two pixel locations.

13. The method of claim 1, wherein in said second diffusing step, said second neighboring at least one pixel location includes second neighboring more than two pixel locations.

14. A system including a processing unit executing instructions for carrying out a computer executable method for halftoning an image, said image formed of an array of scanlines of pixels, comprising the steps of:
   accessing a first set of weight sets;
   accessing a second set of weight sets;
   first diffusing a first error associated with a first pixel location of a plurality of pixel locations to a first neighboring at least one pixel location using a first weight set selected from said first set of weight sets;
   second diffusing a second error associated with a second pixel location of said plurality of pixel locations to a second neighboring at least one pixel location using a second weight set selected from said second set of weight sets; and
   alternatingly performing said first diffusing step and said second diffusing step along each scanline in said image to reduce visual artifacts.

15. The system of claim 14, wherein a first pixel input value is associated with said first pixel location, and a second pixel input value is associated with said second pixel location, further comprising:
   adding a first accumulated error to said first pixel input value;
   thresholding said first pixel input value using a first threshold to determine a first pixel output value;
   adding a second accumulated error to said second pixel input value; and
   thresholding said second pixel input value using a second threshold to determine a second pixel output value,
   wherein each of said first threshold and said second threshold are selected from a threshold lookup table having threshold values that are determined in part based on a combination of at least a first weight set from said first set of weight sets and a second weight set from said second set of weight sets, and
   wherein said first accumulated error is at least partially a result of a previous application of
   said first diffusing step with respect to a previous first pixel location of said plurality of pixel locations, and said second accumulated error is at least partially a result of a previous application of said second diffusing step with respect to a previous second pixel location of said plurality of pixel locations.

16. The system of claim 14, wherein in said first diffusing step, said first neighboring at least one pixel location includes first neighboring two pixel locations.

17. The system of claim 16, wherein each of said first neighboring two pixel locations are located on one of a current scanline and a subsequent scanline.

18. The system of claim 17, wherein each of said first neighboring two pixel locations are located adjacent said first pixel location in a direction the same as said scan direction or in a direction opposite to said scan direction.

19. The system of claim 14, wherein in said second diffusing step, said second neighboring at least one pixel location includes second neighboring two pixel locations.

20. The system of claim 19, wherein each of said second neighboring two pixel locations are located on one of a current scanline and a subsequent scanline.

21. The system of claim 20, wherein each of said second neighboring two pixel locations are located adjacent said second pixel location in a direction the same as said scan direction or in a direction opposite to said scan direction.

22. The system of claim 14, having a first scan direction and a second scan direction, said second scan direction being opposite said first scan direction, further comprising changing a scanning direction from said first scan direction to said second scan direction or changing said scanning direction from said second scan direction to said first scan direction.

23. The system of claim 22, wherein said scanning direction changes for each subsequent scanline in said image to one of said first scan direction and said second scan direction, whereby said image is scanned in a serpentine fashion.

24. The system of claim 14, wherein said first set of weight sets is stored in a first weight set lookup table, and said second set of weight sets is stored in a second weight set lookup table.

25. The system of claim 14, wherein in said first diffusing step, said first neighboring at least one pixel location includes first neighboring more than two pixel locations.

26. The system of claim 14, wherein in said second diffusing step, said second neighboring at least one pixel location includes second neighboring more than two pixel locations.

27. A method for halftoning an image, comprising the steps of:
   determining a plurality of distinct pixel neighborhoods used in forming said image;
   defining a plurality of sets of weight sets, said plurality of distinct pixel neighborhoods corresponding in number to said plurality of sets of weight sets; and
   diffusing error associated with a plurality of pixel locations to neighboring pixel locations using each of said plurality of sets of weight sets, wherein said plurality of sets of weight sets are selectively applied based on a particular distinct pixel neighborhood of said plurality of distinct pixel neighborhoods.

28. The method of claim 27, wherein said plurality of sets of weight sets are selectively applied in a rotating pattern in order to ensure that an appropriate set of weight sets is selectively applied to each corresponding said particular distinct pixel neighborhood of said plurality of distinct pixel neighborhoods.

29. The method of claim 27, wherein said plurality of sets of weight sets are selectively applied in an alternating pattern in order to ensure that an appropriate set of weight sets is selectively applied to each corresponding said particular distinct pixel neighborhood of said plurality of distinct pixel neighborhoods.

30. The method of claim 27, wherein said plurality of sets of weight sets are selectively applied in a repeating pattern in order to ensure that an appropriate set of weight sets is selectively applied to each corresponding said particular distinct pixel neighborhood of said plurality of distinct pixel neighborhoods.

31. The method of claim 27, wherein said diffusing step is applied along a first scanline and along at least a subsequent scanline.

32. The method of claim 27, wherein said plurality of sets of weight sets is more than two sets of weight sets.

33. The method of claim 27, wherein said plurality of sets of weight sets is more than three sets of weight sets.

* * * * *